United States Patent [19]

Weldon et al.

[11] Patent Number: 4,656,328
[45] Date of Patent: Apr. 7, 1987

[54] WELDING FIXTURE

[75] Inventors: James M. Weldon; Theodore A. Aanstoos; Raymond C. Zowarka; William F. Weldon, all of Austin, Tex.

[73] Assignee: Parker Kinetic Designs, Inc., Austin, Tex.

[21] Appl. No.: 674,843

[22] Filed: Nov. 26, 1984

[51] Int. Cl.$^4$ ................... B23K 11/02; B23K 11/26
[52] U.S. Cl. ................................ 219/104; 219/97; 219/112; 219/55
[58] Field of Search ................ 219/97, 100, 101, 104, 219/106, 108, 112, 53, 55, 61.2, 67, 150 R

[56] References Cited

FOREIGN PATENT DOCUMENTS

| 119098 | 9/1984 | European Pat. Off. ............ 219/100 |
| 2546210 | 4/1976 | Fed. Rep. of Germany ...... 219/101 |
| 634308 | 3/1950 | United Kingdom ................... 219/97 |

OTHER PUBLICATIONS

Grant, G. B. et al., "Homopolar Pulse Resistance Welding" *Welding Journal*, (May 1974), pp. 25-36.

*Primary Examiner*—E. A. Goldberg
*Assistant Examiner*—C. M. Sigda
*Attorney, Agent, or Firm*—Marcus L. Bates

[57] ABSTRACT

A welding fixture by which two elongate members are manipulated in a manner to become butt welded together. Two gripping members in the form of groups of spaced slip assemblies are enclosed in mounted relationship within a housing. The slips of each group circumferentially extend about a longitudinal axis of the housing, with the slips of each group being radially spaced from the longitudinal axis of the members to be joined. A first group of slips are mounted for movement within a plane which is perpendicular to the longitudinal axis of the members to be joined. The other group of slips are likewise arranged within a plane spaced from and parallel to the first plane. All of the slips are moved with great force towards the longitudinal axis of the members to be joined. The fixture includes means by which the members are moved toward one another with great force. Each group of slips further include an electrical contact which provides a source of current to each of the members to be joined. The confronting ends of the members to be butt welded are received within the opposed ends of the housing, and extended into close proximity respective to one another, whereupon each group of slips and electrical contacts engage the members to be joined, and the members are then forced into contact with one another, whereupon the confronting ends of the members are butt welded.

36 Claims, 6 Drawing Figures

WELDING FIXTURE

BACKGROUND OF THE INVENTION

The present disclosure relates to the use of the inherent high current of the inertial homopolar generator (HPG) discharge pulse to metal joining by the homopolar pulse welding (HPW) process. In this process, the faying surfaces of two workpieces in contact are preferentially heated as the current traverses the associated interfacial voltage gradient. High force is applied to forge the workpieces together when the proper temperature has been reached.

The advantages of the HPW process include a short welding time (from one to two seconds, independent of cross-sectional area), uniform heat generation throughout the section, a narrow heat-affected zone, and good strength retention. No filler metal is required, and welding can generally be accomplished in air with no preheating or shielding. Also, flash is minimal and relatively little axial upset is required, thereby minimizing material loss.

In accordance with this patent application, an experimental 10-megajoule (10-MJ) laboratory HPG to weld 6 in SHC 80 APIX-52 high strength steel pipe was successfully carried out.

Homopolar pulse welding (HPW) is an upset welding process that uses the unidirectional HPG current pulse to heat preferentially the interface between two workpieces which are lightly loaded mechanically but are in solid contact, and then increases the axial force to forge the workpieces together without melting them. Heat generation is initially concentrated at the interface of the confronting workpieces due to constriction resistance at the faying surfaces. Interface pressure is kept low early in the pulse to maximize the $I^2R$ heating caused by the contact voltage drop. Ideally, the interface and the adjacent bulk material will have heated to forging temperature just as the pressure is increased. The workpieces continue to upset either to material refusal or until a mechanical stop in the welding fixture is reached. The amount of upset is typically between 0.20 and 0.25 inch (0.5 and 0.6 cm), regardless of the weld cross section.

Because of the proximity of the electrical contact leading edges (located as close as 0.5 in. (1.3 cm) on either side of the interface), the heat-affected zone is small compared to that obtained using many other processes. The comparatively high heating and cooling rates and the short time at weld temperature minimize grain growth and undesirable metallurgical reactions. Finally, because of the unidirectional nature of the pulse, current distribution and the resulting temperature distribution are relatively uniform over the cross-section, so that large, irregular sections can be successfully welded.

Photomicrographs of the weld line in a typical welded high carbon steel have shown that the weld line is inconspicuous, but can be detected by the local presence of some alpha veining (ferrite regions) in boundaries of pearlite grains. Presumably, the veining resulted from some superficial decarburization that occurred on the faying surface early in the weld heating cycle, within the second or so before coalescence took place. There was substantial grain refinement in these welds, as can be seen by comparison with the parent metal microstructure. The grain refinement should be beneficial to the properties of the weld. The weld microstructures, apart from the veining, consist of fine pearlite and possibly some bainite, which indicates that the cooling rates at 1,300° F. (700° C.) were between about 900° F. and 1,800° F./min (500° and 1,000° C./min). It was noted that these natural cooling rates are sufficiently low that martensite does not form in the weld zone. This is consistent with the observations of in-plant flash welding of similar materials, in which the welds were being allowed to cool naturally. Therefore, it is concluded that in homopolar pulse welding of carbon steel materials, martensite is not likely to create a problem, but if this conclusion should prove to be in error, there are means for controlling the cooling rates of welds by controlling generator excitation during the pulse.

Experience has shown that the welding electrical contacts need to be clamped onto the smooth, scale-free surface of the workpiece with a minimum pressure of about 2,000 lb/in.$^2$. Otherwise, the contact voltage drop at the electrical contacts/workpiece interface can result in sufficient local heat generation to damage the member (generally the workpiece) that has the lower thermal conductivity. The possibility of local overheating of the workpiece is greater for irregular sections, in which less peripheral length is available for electrical contact placement. For Area 90 A-A rail, the electrode contacts were rectangular chromium-copper blocks 2.0 in. (5 cm) long. This geometry resulted in a nominal electrical contact area current density of 25 kA/in.$^2$ (3.1 kA/cm$^2$) and a leading edge linear current density of 58.2 kA/in. (22.9 kA/cm), higher by factors of 2.5 and 3.5, respectively, over those used in previous welding of pipe.

This disclosure teaches a homopolar pulse welding fixture which addresses and solves many of the problems identified in the prior art. This fixture is capable of welding tubular products having outside diameters in the 6⅝- to 7⅜-in. (16.8- to 19.3-cm) range, cross-sectional areas from 6 to 12 in.$^2$ (38 to 77 cm$^2$), and has been used to produce successful demonstration welds of 6⅝ in. OD×0.427 in. wall (16.8×1.1-cm) API X-52 line pipe with a cross-section of 8.5 in.$^2$ (54.8 cm$^2$). The major problem areas that were addressed in the design of this fixture are:

(1) insufficient electrical contact-to-workpiece interface pressure;
(2) workpiece burning under the leading edges of the electrical contacts;
(3) insufficient mechanical gripping force;
(4) prevention of buckling of the hot workpieces between the mechanical grips; and,
(5) improving rigidity of alignment of the workpieces.

The solutions to each of these problems as applied to pipe and rail welding are achieved by the present invention.

The contact pressure between the electrical contacts and the workpieces is very important in the HPW process. Large current pulses on the order of 70 kA/in.$^2$ of weld area (10 kA/cm$^2$) are fed through the contact surface between the workpiece and the electrical contacts. Currents of this magnitude require high gripping pressures to prevent excessive workpiece heating under the contacts.

For a weld current of 70 kA/in.$^2$×8.5 in.$^2$ or 595 kA, the average current density under the contact would have been 25 kA/in.$^2$ (3.9 kA/cm$^2$) in typical prior art fixture designs. This high current density requires an efficient method of loading the contacts against the workpiece or otherwise local overheating of the workpiece will occur under the contacts.

The fixture of the present invention provides increased electrical contact area and clamping pressure between the electrical contacts and the workpieces. The total electrical contact area is 92.8 in.$^2$ (235 cm$^2$) for the above total weld current, thereby providing a current density under the electrical jaws to 6.4 kA/in.$^2$ (1 kA/cm$^2$). The electrical contact clamping actuators include six electrical contact shoes which provide an area of 15.5 in.$^2$ each (100 cm$^2$) and is actuated by a single 1-8 UNC socket-head cap screw. Torquing of these bolts to their rated seating torque of 1,000 lb. ft (1,350 N.m) generates an axial force of 70,300 lb (313 kN), which corresponds to an electrical interface contact pressure of 4,500 lb/in.$^2$ (31 MPa). It has been found that this amount of contact pressure was not needed with the dual-material contact shoes of this invention, and that the contacts required only 300 lb.ft (400 N.m) of torque to function properly.

The present invention solves the problem of workpiece burning under the leading edge of the electrical contacts. In earlier welding fixtures, the contacts were copper blocks clamped onto the workpiece surfaces. When a weld is made, the discharge current from the HPG would flow from one set of electrical contacts, into the workpiece, across the weld interface, into the second workpiece, and then out through the second set of electrical contacts. The current naturally tries to flow through the path of least resistance, and so it would remain in the lower-resistance electrical contact material for as long as possible. This caused the current to enter the workpiece primarily along the leading edge of the electrical contact shoes, i.e., the edge closest to the weld interface. This caused very high current densities at these leading edges. It was determined through previous experience with other welding fixtures that leading edge contact burning can be prevented if the leading edge linear current density, the total peak weld current divided by the linear dimension of the leading edge of the contact, is kept below 20 kA/in. (8 kA/cm). Comparing this value to the calculated leading edge linear current density in a prior art rail welding fixture of over 50 kA/in (20 kA/cm) predicts that there would be considerable leading edge burning. Assuming that the electrical contact on the 6⅝-in. OD pipe to be welded in the fixture could be designed to utilize about 89 percent of the pipe circumference of 20.8 in. (53 cm), leading edge current density would be 32 kA/in. (13 kA/cm). This value, although lower than the one predicted, is considerably higher than the desired maximum value and led to the discovery that a potential contact leading edge burning problem was involved.

The solution to this problem was to design and build a set of electrical contacts according to this invention that would force the current to enter the workpiece uniformly under the contact area, or at least to enter the workpiece at more than one effective leading edge. The designs to accomplish these two solutions are set forth in the present disclosure. The preferred variable-resistance material selected to cause the current to enter the workpiece uniformly under the electrical contact is not currently commercially available, however, it appears feasible to manufacture a material of this sort by using variable-composition powder metal technology. It also appears possible to manufacture this material by centrifugally casting a metal alloy with different density constituents such as copper and tungsten. For welding the 6-in API X-52 line pipe with a resistivity of 19 μΩ-cm, a 5-in. (13-cm) long variable-resistance sleeve with a low-end resistivity of 2 μΩ-cm would need to increase to about 73 μΩ-cm. These resistivity levels correspond to the resistivity of ETP copper and 304 stainless steel, respectively. The number of different resistance materials required would be determined in accordance with this invention by considering the required number of effective leading edges needed to achieve the desired 20 kA/in. maximum allowable leading edge linear current density. For example, from previous calculations, in order to decrease the 32 kA/in. current density predicted for the X-52 pipe to less than the desired 20 kA/in., two effective leading edges would be necessary. Using equal areas of the two different-resistance materials and choosing ETP copper as the lower-resistance material, leads to a desired resistivity in the high-resistance material of 309 μΩ-cm. This resistivity is too high for commonly available materials, so the design was modified to have unequal areas of the materials. The area ratio of 4 to 1 was chosen for the low-resistance material to high-resistance material ratio. This led to a required resistivity of 123 μΩ-cm in the high resistance material, which corresponds to the resistivity of Hastelloy F. This differential area design increases the current density under the high-resistance material to 14 kA/in.$^2$, which proved to be satisfactory. Testing of this design showed no evidence of contact burning under the leading edge of the electrical contacts.

Homopolar welding of continuous length workpieces, such as pipe or rail, requires that the workpiece be rigidly gripped tightly enough to transfer the forging force necessary to complete the weld into the workpiece through a frictional grip. Previous welding fixtures attempted to do this with mechanically-set clamps which required the use of short deadheaded workpieces before they could produce satisfactory welds. Typical forging pressures of 20,000 to 30,000 lb/in.$^2$ (140 to 200 MPa) across the full weld cross-section produced welds of excellent quality. This forging pressure yields forging forces on 8.5 in.$^2$ (55 cm$^2$) of weld area of between 170,000 and 255,000 lb (750 to 1,000 kN). These forces must be communicated from the welding fixture to the workpiece without damaging it.

In accordance with this invention, the solution of this problem was to incorporate the slip designs used in the oil industry for gripping pipes and casing. These slips typically use multiple rows of serrated-tooth dies set into self-actuating wedges. When used in the oil field, these slips are set by dropping them around the pipe and into a tapered bowl. This design causes the force that is being held to actuate the slips. The harder one pulls on the pipe, the tighter the slips grip. Typical slip ratings for 6⅝ in. OD pipe are 375- and 500-ton (3.3- and 4.4-MN) load capacities. The pipe welding fixture and the rail welding fixture of the embodiments of the invention set forth in the drawings of this disclosure employ 48 gripping blocks set into six separate slip wedges to grip each workpiece. These six slip wedges are radially compressed against the pipe by a hydraulic wedging ring. The force from the hydraulic upsetting cylinder is transferred into the slip wedges through a bearing ring to prevent the forging force from creating excessive hydraulic pressures in the actuating cylinder. The slip wedge design worked very well and has been tested to forces in excess of 500,000 lb (2.2 MN) with surface marking on the pipe being less than 0.030 in. (0.75 mm) deep. This unexpected result has eliminated the problem of mechanical grip slippage that was seen in earlier weld fixture designs.

Another problem area which the welding fixture of this invention successfully addressed was that of buckling of the workpiece between the mechanical grips during the forging action. This problem has been noted on prior art welding fixtures and occurred because of the use of dual off-axis hydraulic cylinders to generate the forging force. The forces produced by these cylinders often were of unequal magnitude, especially during the dynamic portion of the forging action. Consequently, there was a possibility of imposing eccentric loads on the workpieces, causing the onset of buckling at lower loading values than those predicted for non-eccentric loads. Another difficulty discovered through use of prior art rail welding fixtures arose from the relatively large distance between the mechanical clamps and the lack of any rigid lateral restraint of the workpieces between these clamps. Assuming an effective diameter of the rail to have been about 5½ in., then the 29-in. length between the mechanical clamps gave a column L/D ratio of 5.27 to 1.

The solution to this buckling problem was accomplished with the present novel pipe welding fixture by the provision of three design features. The first novel feature was to use a single annular upsetting cylinder with the workpiece located on the centerline of the cylinder. This eliminated any possibility of eccentric forging forces on the workpieces. The second novel feature was to close-couple the mechanical clamps. The distance between the clamps on the fixture of the present invention is only 17 in. (43 cm), which corresponds to a column L/D ratio of 2.6 to 1 for the 6-in. pipe. The mechanical grips themselves are designed to have a relatively large L/D ratio of 2.1 to 1, thereby providing a rigid cantilever support of the workpiece. The third novel feature as a means for preventing workpiece buckling between the mechanical grips by making the electrical clamps radially rigid, thus providing significant lateral restraint to the workpieces between the grips. These methods and apparatus achieved by the present invention solved the problem of workpiece buckling.

The problem of maintaining good mechanical alignment of the workpieces during the welding process is closely related to the problem of preventing eccentric workpiece loading and subsequent buckling. The novel solution set forth herein is the provision of a rigid lateral positioning and support structure for the workpieces that concurrently allows for axial motion required during the forging action. This was accomplished in accordance with this invention by the incorporation of several of the previously described design innovations, including:

(1) the laterally rigid electrical contacts;
(2) the mechanical slips being located and actuated by an annular wedge ring; and,
(3) enclosure of the entire welding fixture within a single rigid case or housing.

Prior art heavy-section welding fixtures often rely on multiple precision-machined ways to provide lateral rigidity while providing for axial movement. Although this type of design is functional, the relative lateral stiffness of the machined ways is much less than that of the heavy-wall large-diameter enclosure used to provide mechanical alignment in the present welding fixture. The use of these alignment solutions has produced a fixture which has shown no noticeable misalignment through the various welding programs.

SUMMARY OF THE INVENTION

The present invention comprehends a welding fixture assembly for butt welding axially aligned elongated workpieces together. The fixture assembly includes a cylindrical main frame member which suitably supports spaced gripping members therewithin. The gripping members include a first group of radially spaced apart slips and a second group of radially spaced apart slips. The first group of slips are axially spaced from the second group of slips so that each set of slips can receive the marginal ends of confronting workpieces therewithin and support the workpieces with great gripping force. Each group of slips are actuated by a single annular upsetting cylinder aligned along the central axis of the workpiece. A minimum distance between the spaced groups of slips is achieved by the present invention.

A first group of radially spaced conductor segments are axially spaced from a second group of radially spaced conductor segments, and each group of radially spaced segments circumferentially extend about an axis in a manner to receive the workpiece therethrough, with the first group of conductor segments being arranged for making electrical contact with the workpiece supported by the first group of slips; and, the second group of conductor segments being arranged for making electrical contact with the workpiece supported by the second group of slips. The conductor segments include a plurality of electrical contact shoes. Each shoe has contacts made of different resistance material arranged to achieve a predetermined leading edge current density between the shoe and the workpiece.

Means are provided by which the slips of a group are forced radially inward and into gripping contact with the outer surface area of a workpiece. Means associated with each group of slips concurrently move the conductor segment into good electrical contact respective to the outer surface area of a workpiece.

Means are provided by which the first and second groups of slips can be forced to move axially towards one another, whereby the confronting butt ends of the workpieces are forced into abutting engagement respective to one another and thereby become butt welded when sufficient current is supplied through each group of conductor segments.

A primary object of the present invention is the provision of a welding fixture assembly having a longitudinally extending passageway formed therethrough through which confronting workpieces in the form of elongated members can be received and abuttingly engaged to thereby butt weld the two members together.

Another object of the present invention is the provision of apparatus for welding two members together which include confronting groups of hollow gripping devices and confronting groups of hollow electrodes, each gripping device and electrode can be moved towards one another and into intimate contact with the members to be joined, and one group can be moved towards the other group to move the members into contact with each other.

A further object of this invention is the provision of an apparatus having an axial passageway formed therethrough through which two members to be butt welded can be extended, and wherein the apparatus includes gripping apparatus for forcing the members into abutting engagement with one another, and further including retractable contact means by which current flow to the apparatus is provided.

A still further object of this invention is the provision of method and apparatus for butt welding elongated members into a continuous member by gripping the members to be joined and moving the members into contact with one another while an improved current flow path is provided respective to the two members.

An additional object of this invention is the provision of a welding fixture for butt welding two confronting members together by gripping each of the members and thereafter moving the members toward one another while forming a current flow path to each of the members thereby forming a weld at the confronting ends of the members.

A further object of this invention is the provision of method and apparatus by which an HPG can be used in combination with a unique welding fixture to enable elongated members to be butt welded.

Another object of this invention is the provision of a welding fixture having an improved clamping system and an improved electrical contact system which effects a superior butt weld between two workpieces.

An additional object of this invention is the provision of a welding fixture which provides improved mechanical grip and electrical contact to workpiece interface pressure, avoids workpiece burning under the leading edge of the electrical contacts, provides improved mechanical gripping force for the workpiece, avoids buckling of the hot workpieces between the mechanical grips, and achieves improved rigidity of alignment between the workpieces.

A still further object of this invention is the provision of a welding fixture comprising spaced confronting gripping elements and spaced confronting electrodes, each of which circumferentially extend about the interior of a housing and thereby form an axial passageway through which spaced elongated workpiece members can be received and moved into abutting relationship respective to one another while a current flow through each of the members forms a weld at the abutting interface thereof.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described in the above abstract and summary.

DETAILED DESCRIPTION OF THE PREFERRED EMBODIMENT

Figure 1:
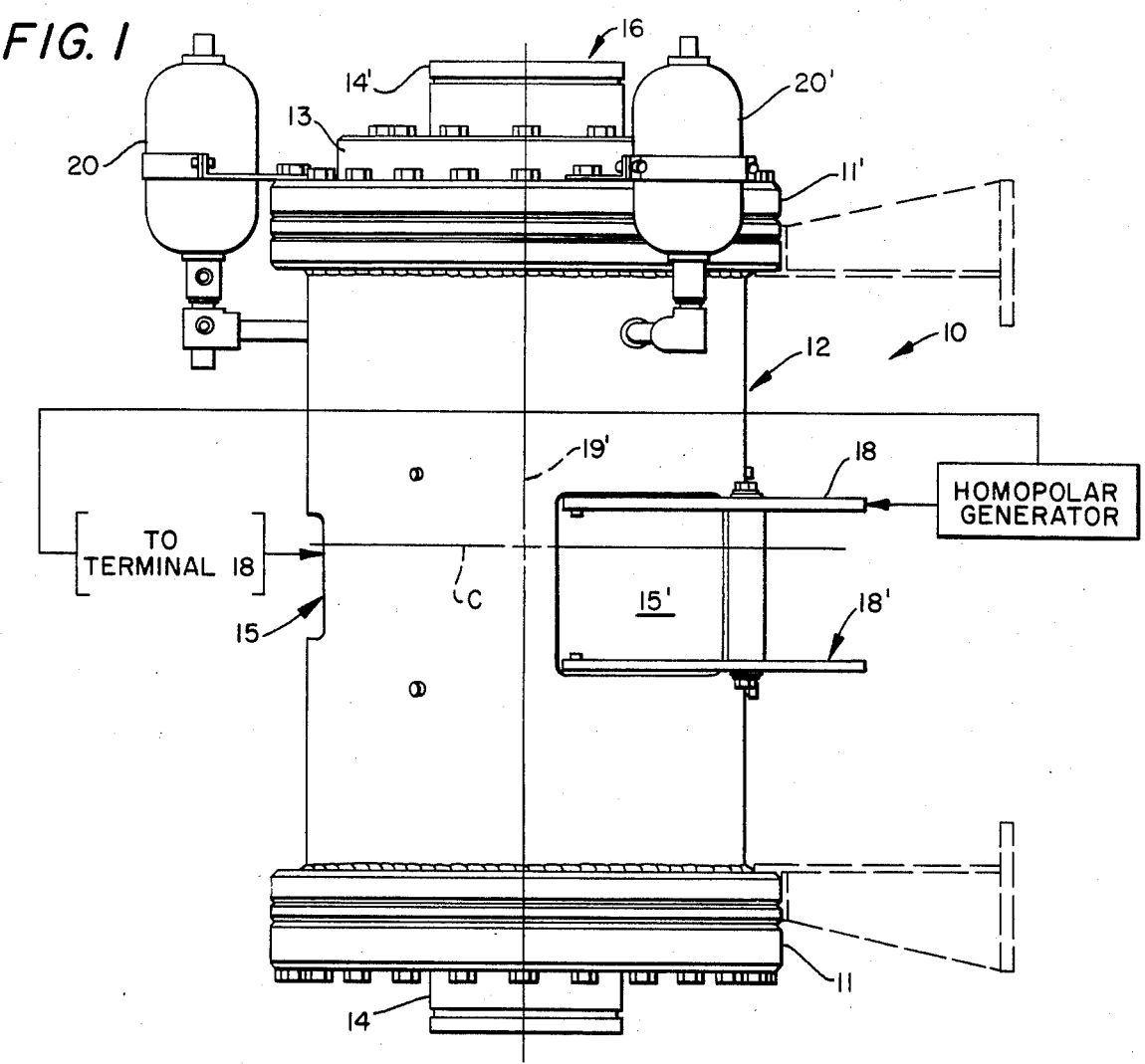
FIG. 1 is a side elevation view of a welding fixture made in accordance with the present invention.
Figure 2:
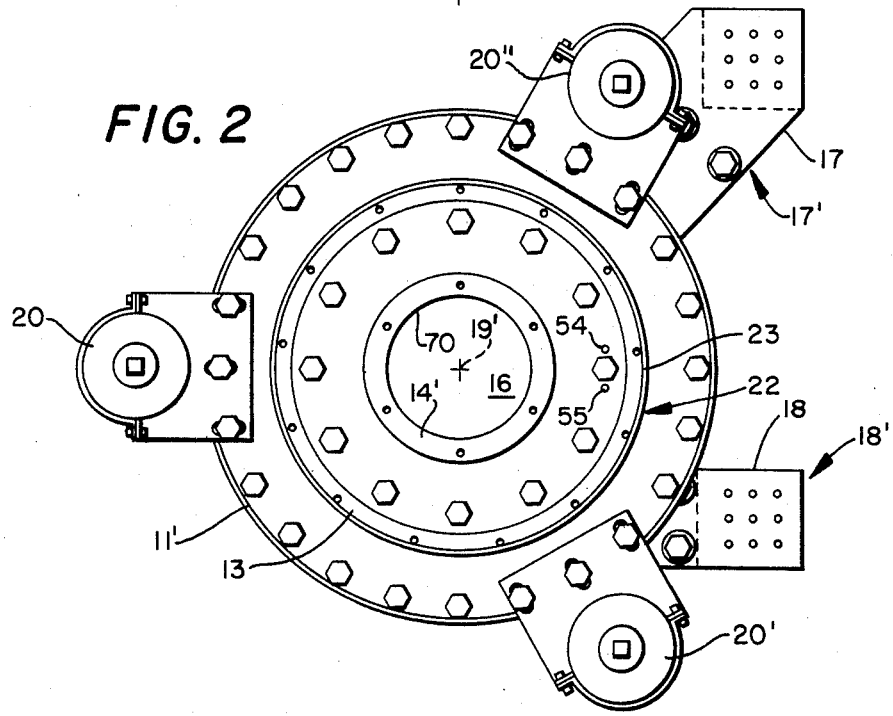
FIG. 2 is an end view of the apparatus disclosed in FIG. 1.

In the figures of the drawings, and in particular FIGS. 1 and 2 thereof, there is disclosed a welder fixture, generally indicated by the arrow at numeral 10, made in accordance with the present invention. The fixture includes opposed annular end pieces 11 and 11', supported from a central housing or main frame member 12, the details of which will be more fully discussed later on in this disclosure. Annular end 13 is located between an adjacent stop ring 14' and end piece 11". The opposed adjustment stop ring 14 is located at the other end of the fixture. Windows 15, 15' are located in a plane C arranged perpendicular respective to the longitudinal axis of the fixture. The arrow at numeral 16 broadly indicates a passageway or tunnel located along the longitudinal axial centerline of the fixture through which workpieces, such as lengths of pipe or rail, can be positioned.

Electrical bus bars 17, 17' and 18, 18' form a source of current for the fixture and are arranged in pairs, with the pairs being circumferentially spaced from one another and received through the windows 15, 15'. Numeral 19' indicates the before mentioned longitudinal axial centerline formed through the main housing of the fixture.

Three hydraulic accumulators 20, 20' and 20" are suitably supported from the main housing in the illustrated manner of the figures. Each hydraulic accumulator includes a pilot dump seat valve 21.

Figure 3:
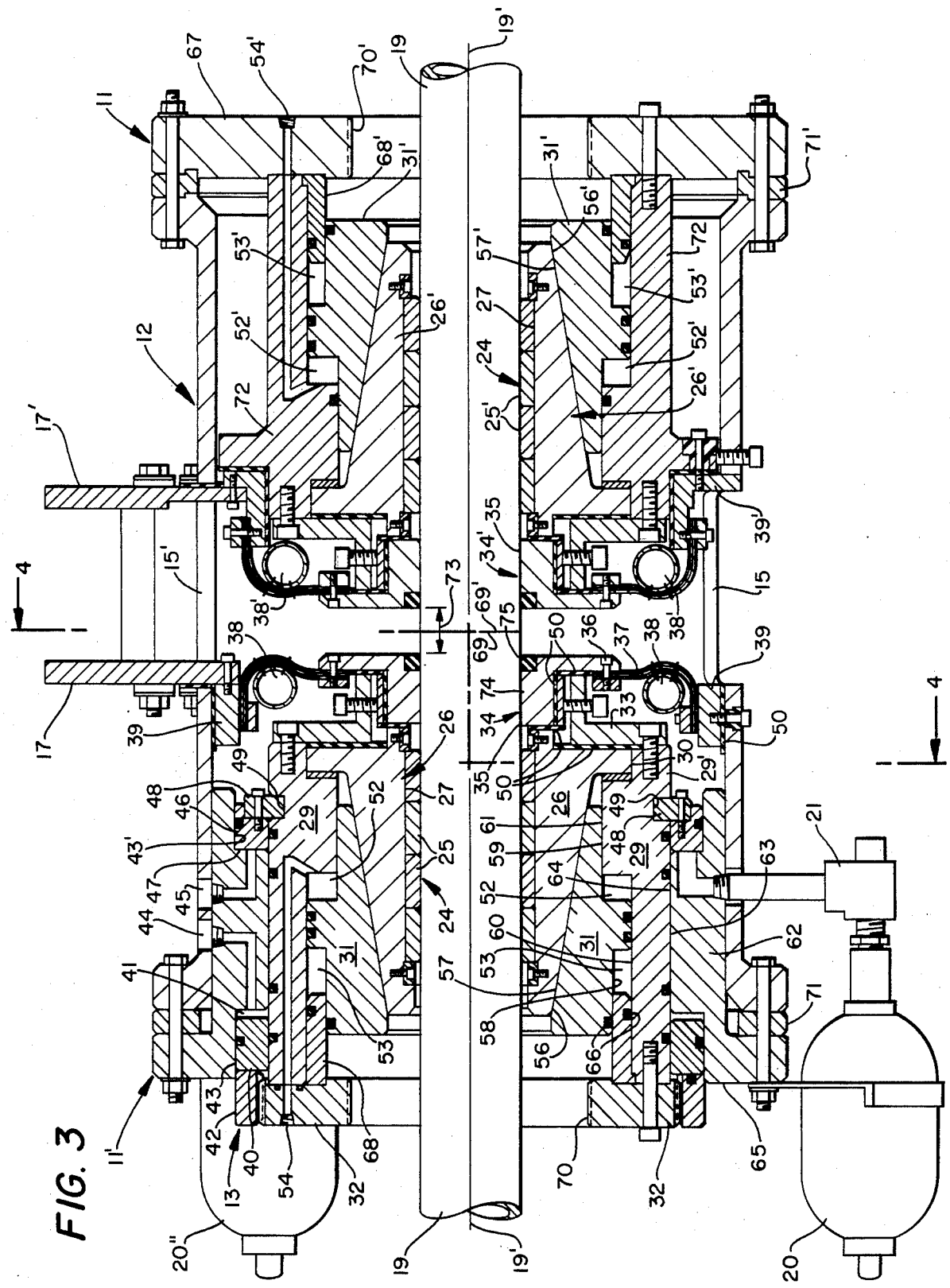
FIG. 3 is an enlarged, longitudinal, cross sectional view of FIG. 2.
Figure 4:
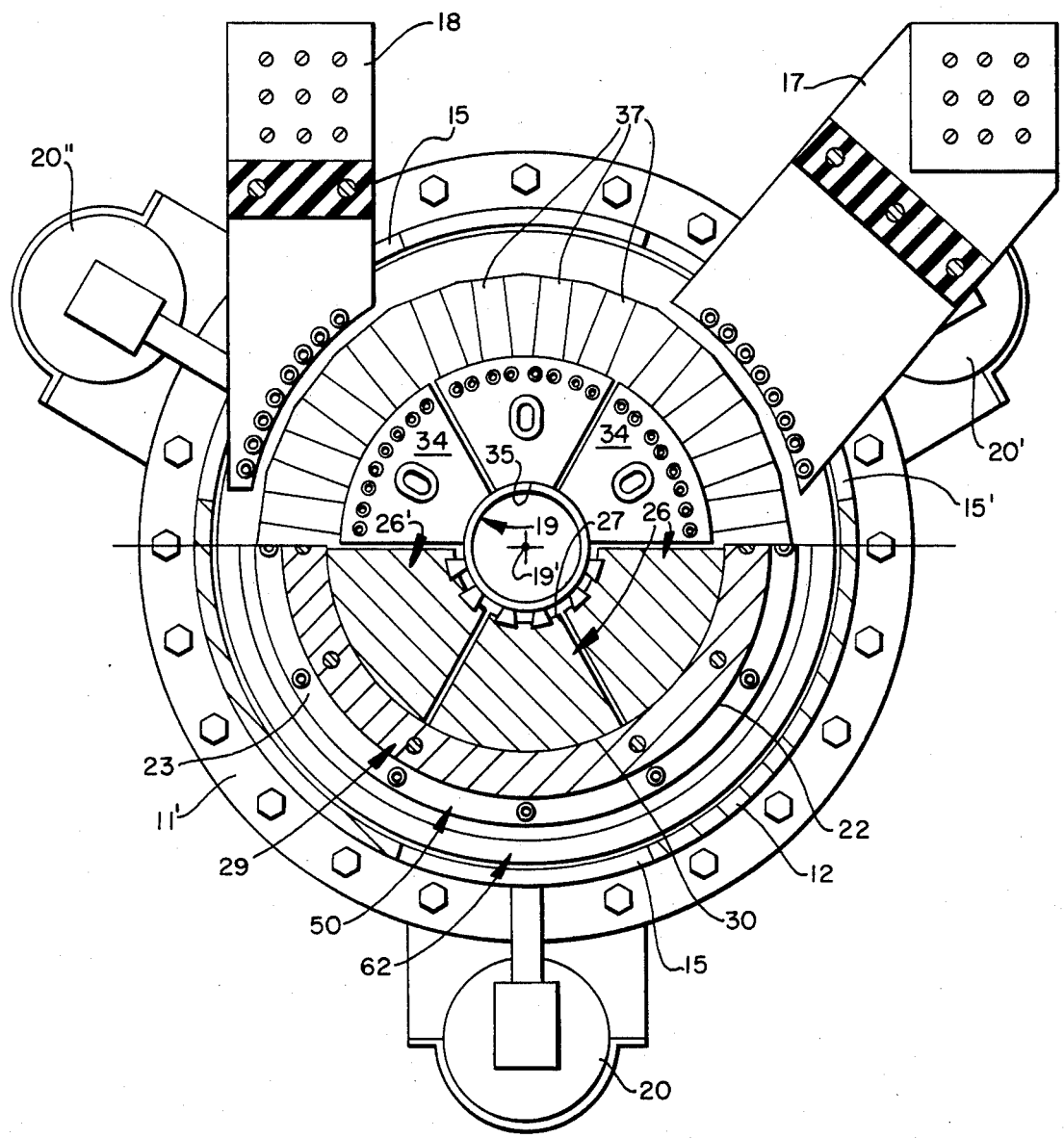
FIG. 4 is a part cross-sectional view taken along line 4—4 of FIG. 3.

As best seen illustrated in FIGS. 3 and 4, together with other figures of the drawings, the fixture of the present invention includes spaced gripping members, each of which are made up of rows 24 of slip inserts, with each row of slip inserts including individual slips 25. The rows of slips are supported within a slip holder segment 26 which is moved in a manner to force the individual slips to bear against a pipe 19 which may extend along the axial centerline 19' of the fixture. The slip holder segments are circumferentially arranged about the axial centerline of the fixture and therefore are radially spaced from the longitudinal centerline 19'. Numeral 27 indicates the side of the segment 26 that is of a configuration for capturing the individual slips 25 therein.

An annular cylinder 29 has a shoulder formed at one marginal end thereof for accommodating a large o.d. portion 30 of the slip holder segment 26. A slip segment expander 31 is of annular construction and is received in mounted relationship within the annular cylinder 29. The expander 31 reciprocates respective to the annular cylinder 29 to thereby expand the slip segments 26 towards and retract the segments 26 away from centerline 19'. The annular cylinder 29 is attached to an annular end plate 32. The annular cylinder 29 is also affixed to a conductor pressure segment 33 by means of the illustrated attachment bolt to thereby provide a mount means for a conductor segment 34 made in accordance with this invention. The conductor segment 34 and the slip inserts 25 are contoured at the innerface 35 thereof and thereby made complementary respective to the outer surface of the elongated workpiece 19 so that the workpiece is properly received thereagainst. The conductor segment 34 includes an outwardly directed ear 36 which is suitably affixed to one marginal end of a laminated flexible electrical current feed strap 37. An anti-flex ring 38 circumferentially extends about the longitudinal passageway formed through the fixture and provides a tie down for the current feed strap 37. The other end of the current feed strap is affixed to a current feed ring 39. The current feed ring 39 is supported in an insulated manner from the main housing and is electrically connected to the bus bar 17 and 18. The current feed ring 39, current feed strap 37, conductor segments 34, are all insulated respective to the main body by the provision of the illustrated various insulation means, the details of which will become apparent to those skilled in the art as the drawings are more fully digested.

A depth adjustment ring 40 is of annular configuration and cooperates with the annular cylinder 29 to form an expansible chamber 41. A depth adjustment seal ring 42 is affixed to the before mentioned end plate 32 and is abuttingly engaged by the depth adjustment ring 40. Cylinder wall 43 reciprocatingly receives the depth adjustment ring 40 in a sealed manner therewithin. Power fluid ports 44 and 45, respectively, lead to expansion chambers 41 and 47, respectively. A pressure cylinder stop ring 46 is sealingly received within bore 43' and cooperates with annular cylinder 29 to form the before mentioned expansion chamber 47.

A pressure cylinder lock ring 48 is received within groove 49 formed within annular cylinder 29 and thereby rigidly affixes members 29, 48, and 46 to one another so that when fluid pressure is effected at passageway 45, the pressure cylinder stop ring 46 is forced to move along a parallel plane respective to the axial centerline 19', thereby reciprocating annular cylinder 29 and the gripping member.

Numerals 50 indicates some of the before mentioned insulation which electrically isolates the conductor segments 34 from the main housing and from the slip inserts, so that current flow from the bus bars is available to conductor segments and the workpiece.

Expansion chambers 52 and 53, respectively, are connected to fluid passageways 54 and 55, respectively, and force the slip actuator or slip segment expander 31 to reciprocate towards and away from the other gripping member. This action also forces the slips to move towards the center, 19', of the fixture.

Each of the slip holder segments 26 has a sloped outer face at 56 made complementary respective to the sloped interface 57 of the slip expander 31. The cylindrical surface 58, 59, 60, and 61 of the annular cylinder 29 and the slip expander 31 are arranged parallel respective to the longitudinal axial centerline 19' of the fixture.

A pressure control cylinder 62 reciprocatingly receives the annular cylinder 29 therewithin. Numeral 63 indicates the o.d. of the annular cylinder 29 while numeral 64 indicates the i.d. of the pressure control cylinder 62. Bolt flange 65 supports the pressure control cylinder from the main housing 12.

Seals 66, which can take on many different forms, prevent leakage of power fluid from chambers 41, 47, 52, and 53. End plate 67 provdes a bolt circle by which the slip assembly and conductor segment, along with their co-acting parts, are supported from the main housing in properly aligned relationship respective to the confronting elongated members 19 which extend axially through the fixture and into abutting engagement with one another.

On the right hand side of FIG. 3, a lower seal carrier 68' is attached to the end plate 67 and cooperates with the slip expander 31' to form expansible chambers 52' and 53'. Numerals 69 and 69' indicate the confronting abutting terminal ends of two elongate members, each of which are received within the fixture from opposite ends thereof.

Ports 70, 70' formed within members 32, 67 form the entrance for opposed workpieces, such as pipe ends 69, 69' to be received axially within the fixture. Flange spacers 71, 71' properly space out the pipe grippers and electrical contacts therefor respective to the remaining components of the fixture. Pressure cylinder 72 is supported by end plate 67 and therefore is adjustably fixed respective to the main housing 12. The slip actuator or expander 31' annular construction and reciprocates within the limits provided by the opposed walls of the chambers 52' and 53'. Numeral 73 indicates the spaced distance between the confronting faces of adjacent conductor segments 34, 34' which preferably are maintained at least one-half inch apart to thereby avoid inadvertent shorting of the two contacts together.

The conductor segments 34 are preferably provided with contact shoes having two different metal compositions 74 and 75 which are of different resistance and thereby effectively provide two leading edges, and will therefore decrease the leading edge current parameter to a lower value.

In operation, two elongated members, such as a pipe, are positioned in the illustrated manner of FIGS. 3 and 4 within the welding fixture. This is achieved by moving each of the members towards one another, along the longitudinal axial centerline 19' of the fixture, with the ends of the workpiece entering the central passageway through the entrances 70, 70'. The members are spaced apart approximately one-half inch, and then the slip actuators or expanders 31, 31' are moved towards one another by effecting fluid pressure within chambers 53, 53'. This action increases the volume of chambers 53, 53' while the volume of chambers 52, 52' decreases, and consequently the slip actuators 31, 31' are moved towards one another, causing the wedge-like faces of the slip segments 26, 26' toward the longitudinal axial centerline of the fixture. This action causes all of the slip inserts to be forced radially inward against the surface of the pipe with great force, thereby temporarily anchoring each pipe length to each of the groups of slips.

Next, a first fluid pressure of about 500 psi is effected at passageway 45, causing expansible chamber 47 to increase in volume while chamber 41 decreases in volume. This action moves annular cylinder 29 towards the pressure cylinder 72, and brings the confronting ends of the pipe into abutting engagement with one another, and establishes a current flow path from bus bar 17, 17' through the marginal confronting ends of the pipe lengths to be joined once the conductor segments 34, 34' are engaged with the pipe surface. Current flowing from bus bar 17, through the contact shoes 34, and into the pipe confronting marginal ends rapidly heats the interfacial area to forging temperature, as dump valves 21 are actuated to increase the pressure within chamber 47 up to about 5000 psi. This action further moves the gripping members toward one another as the workpieces continue to upset either to material refusal or until the mechanical stops are reached. The amount of upset is about 0.20–0.25 inches. After the butt weld has been effected, the slips are released from the pipe by effecting power fluid pressure within chambers 52, 52', while releasing the pressure from chamber 53, 53'. This moves the slip actuators away from one another, whereupon the slip segments of each group are moved radially away from the pipe, which is released from the gripping members of the the fixture, conductor segments 34, 34' are disengaged from the pipe surface, and the fixture can then be moved axially respective to the pipe length until the free end of the pipe is again positioned at 69 and another weld can be made.

Figure 5:
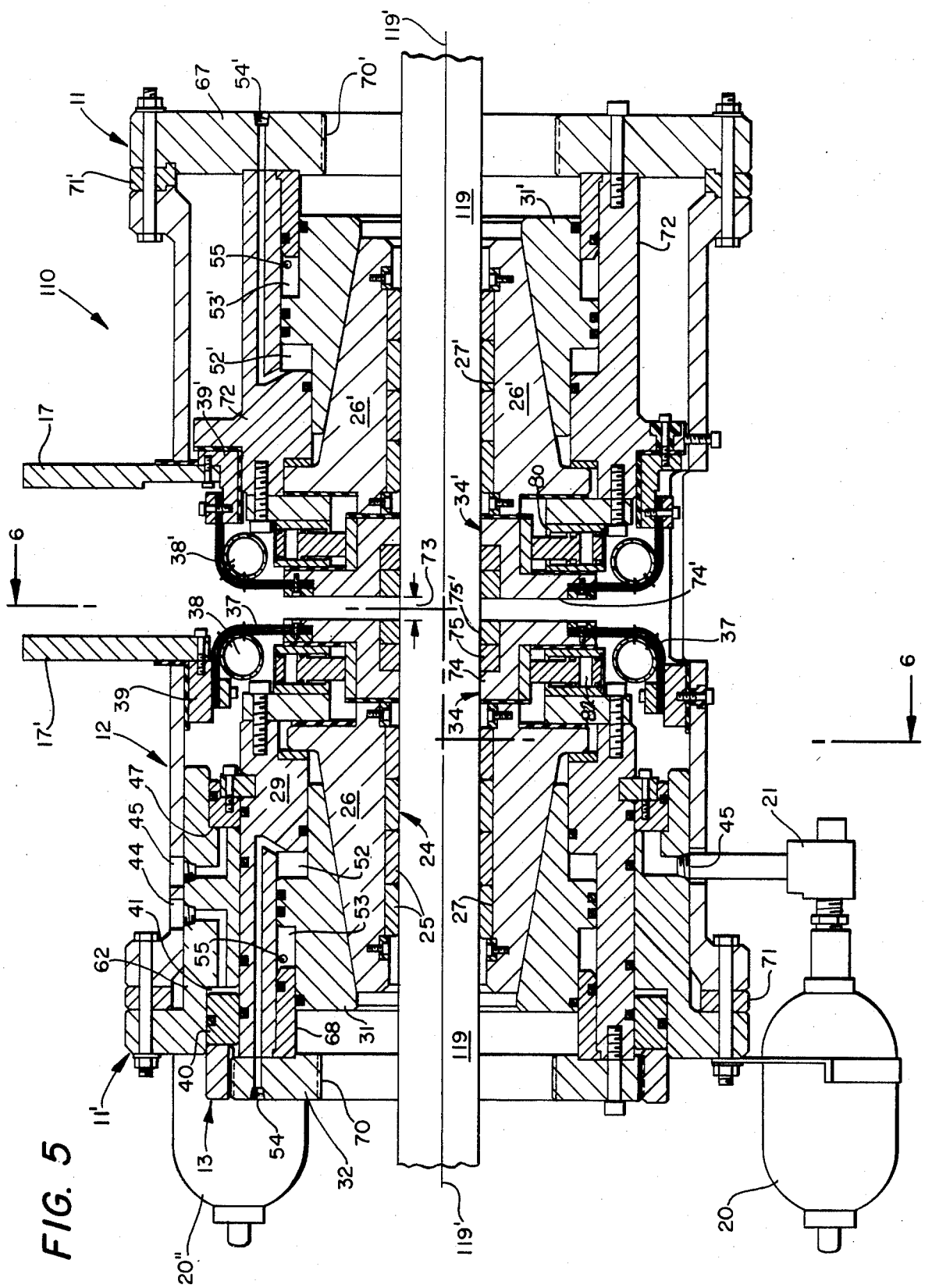
FIG. 5 is an enlarged, longitudinal, cross-sectional view of an alternate embodiment of the apparatus disclosed in FIGS. 1 and 2; and, FIG. 6 is a part cross-sectional view taken along line 6—6 of FIG. 5.
Figure 6:
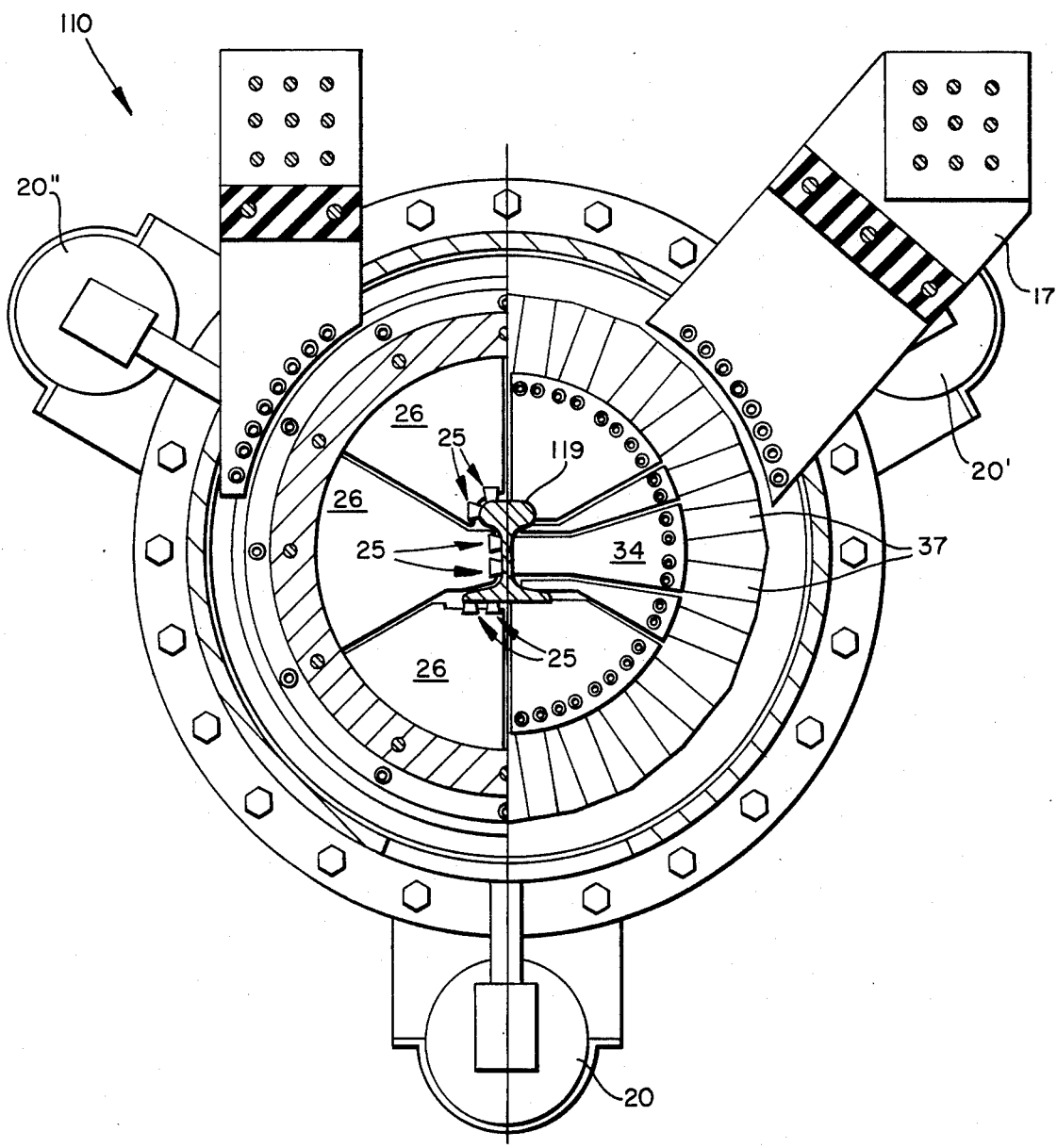

In the second embodiment of the invention disclosed in FIGS. 5 and 6, wherein like or similar numerals refer to like or similar elements respective to FIGS. 1–4, the welding fixture 110 is for butt welding lengths of rail, as for example railroad rails 119, into a continuous rail of almost any length.

In FIGS. 5 and 6, the marginal ends of the rail 119 to be joined are moved axially towards one another and through the entrance 70, 70' of the welding fixture until the confronting ends of the rails almost abuttingly engage one another. The slip segments 26' located on the right half of FIG. 5 move radially inward respective to the axial centerline 119', however the slips 26' do not move axially along the longitudinal axial centerline of the fixture and, therefore, the length of rail captured within the right hand slip segments is held in fixed, aligned, relationship respective to the main housing 12.

The length of rail captured by the slip segments located on the left hand side of FIG. 5 is engaged by the slip inserts 25 with great force, and thereafter the left hand rail is moved by the movable gripping member into abutting engagement respective to the right hand rail so that great compressive forces are developed at the confronting faces thereof. Movement of the left hand segments toward the right hand segments is achieved by effecting power fluid within expansion chamber 47. Movement of the slips toward one another is effected by power fluid effected within chamber 53, which moves the annular cylinder 31 within the fixed pressure cylinder 29.

As previously mentioned, the interface between the workpieces are lightly loaded mechanically but are in solid contact by the provision of a relatively low magnitude of power fluid pressure effected within chamber 47, while gripping pressure is concurrently maintained within chamber 53. Heat generation is initially concentrated at the interface of the abutting workpieces due to constriction resistance at the faying surfaces. Interface pressure is kept low early in the pulse to maximize the I2R heating caused by the contact voltage drop. Next, as forging temperature is reached, the pressure within chamber 47 is greatly increased to cause the workpieces to continue to move together until the proper amount of upset has taken place.

The flange spacer 71 and relative position of the coacting parts of the fixture assures that the confronting faces 74, 74' of the conductor segment 34 never move into electrical contact respective to one another. Instead, electrical contact is made with the right and left hand rail lengths, respectively, by means of the right and left hand conductor segments 34' and 34, respectively.

The rows of slip segments are arranged in the manner of FIGS. 5 and 6 with respect to the outer surface of the rail so that the resultant radial forces developed by the slip inserts engage the rail with great compressive forces applied in the most optimum direction. In particular, in the illustrated embodiment of FIGS. 5 and 6, there are six slip holder segments 26, each having two rows 25 of slip inserts 24, with each row of inserts comprising four slip elements, each of which are attached to the inner circumferentially extending face of the slip holder segment. The rows 25 of slip inserts 24 provide 48 individual slip inserts for engaging each of the rail lengths to be butt welded.

EXAMPLE

A plurality of lengths of rails 119, 119' are to be butt welded into one continuous length of rail. The rail weighs 90 pounds per yard. The welding fixture 110 preferably is arranged to travel along the length of the road bed which is to support the continuously welded rail. Conventional hydraulic pumps (not shown) are connected to supply a source of power fluid and return spent power fluid to and from the various flow passageways of the welding fixture in a manner set forth above. In particular, power fluid is supplied to each of the accumulators 20, 20', and 20" which in turn are connected to supply very high pressure through dump valve 21 and into port 45 connected to expansion chamber 47. Chamber 47 is also connected to the before mentioned 500 psi power fluid source for intially moving the workpieces into contact with one another. Each of the chambers 41, 47, 52, and 53 are suitably connected respective to the return line associated with the suction side of the hydraulic pump.

A pulsed Homopolar Generator is suitably connected through a switching means to provide a suitable difference in potential between the bus bars 17, 17' and 18, 18'. A Homopolar Generator that has suitable voltage and amperage characteristics is identified, as follows: 15; M.J. Fara-Drum Homopolar Generator, manufacturer parker Kinetics Designs; Inc. of Austin, Tex.

The accumulators 20, 20', 20" can be Robert Bosch hydraulic accumulators of 2½ gallon capacity. The pilot dump seat valve 21 is available from Abex Dennison.

Those skilled in the art will now appreciate that the pipe welding fixture disclosed in FIGS. 1 and 2 can be converted into either the pipe welder of FIGS. 3 and 4 or the rail welder disclosed in FIGS. 5 and 6. The fixture of FIGS. 5 and 6 is capable of producing full cross-sectional welds in 90 lb/yd railroad rail. The cross-sectional area of this workpiece is 8.82 in.$^2$ (57 cm$^2$), which is ideally suited to welding in this fixture. The modifications required to be made to the pipe welding fixture to convert it into a rail welder are: The manufacture of the illustrated set of mechanical slip wedges designed to properly grip the rail shape; a new set of electrical contact jaws designed to accommodate the rail shape and its non-axisymmetric shape; and, a new electrical contact actuating mechanism to allow for automated control of this function.

The mechanical grips used in the rail welder of FIGS. 5 and 6 are very similar to the mechanical grips used on the pipe welder described in conjunction with FIGS. 3 and 4. The same number of serrated-tooth gripping blocks is used for welding 90 lb/yd rail as were used to weld the 6-in. schedule 80 pipe. The arrangement shown in FIGS. 5 and 6 incorporates four rows of four blocks per row on the rail head, web, and base. This gripping pattern distributes the force throughout the rail section, as opposed to a rail welder which gripped only the web, for example. Because the same ratio of gripping area to weld area is used between this novel rail welding fixture and the successful pipe welder, mechanical gripping is accomplished without the slipping problems which may be encountered in the prior art. Setting of the mechanical grips is done by using the same tapered wedge ring method as is used on the pipe welder.

The electrical contacts used on the rail welder of this invention are designed to have a leading edge perimeter of 15.95 in. and be 5.50 in. long (40 and 14 cm). The expected maximum discharge current they will see is about 75 kA/in.$^2$ (11.6 kA/cm$^2$) across 8.82 in.$^2$ (57 cm$^2$) for a total of 661.6 kA. The contact area of each set of electrical contacts is 87.7 in.$^2$ (566 cm$^2$), which would produce a current density on discharge of 7.5 kA/in.$^2$ (1.2 kA/cm$^2$). This unexpected low value is significantly less than has been realized by other known welding fixtures.

The problem of edge burning is solved by the electrical contacts of this invention. For single-material electrical contacts, the leading edge current parameter for this welder would have been 41.5 kA/in. (16.3 kA/cm), or about twice what is specified herein as a design maximum. For this reason, an unusual three-material electrical contact shoe system similar to that seen at 74,75,75' in FIG. 5 was employed. Because the measured resistivity of 90 lb/yd rail steel is about 18 $\mu\Omega$-cm, one can calculate that the required resistivity of 75 and 75' should be 66 and 129 $\mu\Omega$-cm, respectively. These values correspond closely to the resistivity of type 304 stainless steel and Hastelloy B, so these materials are preferred to fabricate the electrical contacts for the rail welder of this invention. These novel triple-material shoes will, in effect, give three leading edges each 15.95 in. (40 cm) long, and will therefore decrease the leading edge current parameter to the acceptable level of 13.8 kA/in. (5.4 kA/cm). Because all three of the jaw materials have the same contact area with the workpiece, the current density for all three should remain at the 7.5 kA/in.$^2$ value.

Other design innovations incorporated into the electrical contacts of the present rail welding fixture involve the manner in which current is distributed to the various electrical contacts and the current flow path into the workpiece. The current from the generator is distributed within the welding fixture through two heavy copper bus rings 39, 34 of FIG. 5. From these rings, the current passes to the individual electrical contacts 34, 34' through 48 bundles of copper straps 37. Each of these strap bundles, 24 per workpiece, is a set of fifty 0.010-in.-thick copper straps 2.0-in. wide (0.25 mm×5 cm). Four bundles feed current, to each of the six individual electrical contact shoes 34, 34' located on each end of the welding fixture. By adjusting the number of straps in a particular bundle, the current entering the workpiece in a particular area can be increased or decreased as may be desired. This unusual concept allows for field adjustment of the current distribution to insure uniform heating throughout the weld cross-section in a new and novel manner. Still another design innovation concerns the method of passing current from the electrical contacts into the workpieces. Because of the differing cross-sectional areas of the rail head, web, and base, it was previously found that current preferably is fed from the top side of the base and the sides and bottom of the head as well as from the more easily accessible areas. The fixture of this invention is uniquely designed to use radial contact actuators, and since it is very difficult to achieve the required electrical contact pressure in the less accessible regions using this radial actuation, this problem is overcome through the use of two special electrical contacts used to contact the sides of the rail web. These contacts also feed current into the bottom of the rail head and the top of the rail base. Contact pressure on these two areas is achieved through the illustrated wedging action. The portions of the electrical contacts that engage these areas are spring-loaded in order to apply the required pressure as a result of their radial action.

Another improvement incorporated into the rail welder of the present invention is the before mentioned automatic hydraulic actuation of these electrical contacts.

These contacts are set and released from the welder control panel and require no manual manipulation before removal of the completed weld. Their function is the same as previously described in conjunction with the pipe welder. In the rail welder, the 1–8 UNC sockethead cap screw used to actuate the electrical contacts o the pipe welder is replaced with the two high-pressure built-in hydraulic cylinders seen at 80 in FIG. 5. Each of the 12 electrical contact sections are actuated by two 2.0-in. (5-cm) bore 5,000 psi (34 MPa) and at this design pressure will produce 31,416 lb (140 kN) of electrical contact clamping force on each contact segment. The largest single-segment contact area on the rail welder is 11.0 in.$^2$ (70 cm$^2$), which corresponds to a contact pressure of 2,856 psi (19.7 MPa). From previous experience, this contact pressure across the large overall contact area of 87.7 in.$^2$ (565 cm$^2$) should prevent the contact burning problems seen in prior art weld fixture designs. Since each of the electrical segments in a contact set is a separate floating contact, this design also allows a large dimensional variation in rail while producing good electrical contact over most of the rail surface.

TABLE 1

| Average HPW rail welding parameters (area 90A-R) | | |
|---|---|---|
| Parameter | Value | Units |
| Peak current | 575 | kA |
| Peak voltage | 23 | V |
| Current rise time | 85 | ms |
| Pulse duration | 3.2 | s |
| Weld zone energy density | 0.15 | MJ/in$^2$ |
| Initial pressure | 6,000 (41.3) | lb/in.$^2$ (MPa) |
| Upset pressure | 34,000 (234.5) | lb/in.$^2$ (MPa) |
| Time to upset | 640 | ms |

I claim:

1. A welding fixture for butt welding a first workpiece to a second workpiece, comprising:

a main frame; a first gripping member for engaging and releasably holding a first workpiece; first support means affixed to said main frame for supporting said first gripping member;

a second gripping member for engaging and releasably holding a second workpiece; second support mens movably mounted respective to said main frame for supporting said second gripping member and for moving said second gripping member towards said first gripping member;

first and second electrical contact means for releasably engaging a first and second workpiece, means providing a source of currect for said first and second contact means; means by which said first electrical contact means is mounted to said first support means, means by which said second electrical contact means is mounted to said second support means;

said first and said second gripping members, respectively, each include a plurality of slip segments mounted in radially spaced relationship respective to a first and second workpiece, respectively, to be received therewithin; said slip segments of each gripping member can move towards one another and into engagement with a workpiece that may be positioned therewithin;

whereby, spaced first and second workpieces, respectively, can be received within said first and second gripping members, respectively, said electrical contact means moved into engagement with the workpieces so that current flows therethrough, the first and second support means moved towards one another to thereby move the workpieces into abutting engagement, and weld the workpieces together.

2. The welding fixture of claim 1 wherein said first and second gripping members each include:

a working barrel supported in attached relationship to said main frame, an annular piston reciprocatingly received within said barrel, means for moving said annular piston axially respective to said barrel; said annular piston has an inside diameter of conical configuration to provide a wedge-like inner surface; said plurality of slip segments are made into an annular slip holder to provide an interior passageway which changes in cross-sectional area as the segments are moved towards and away from one another, the outside diameter of said annular slip holder is made complementary respective to the conical annular piston;

and a plurality of slips for engaging a workpiece arranged on the inside surface of the slip holder.

3. The welding fixture of claim 2 wherein there is further including means forming spaced variable chambers associated with said barrel and annular piston for moving the piston respective to the barrel so that the annular piston extends and retracts the slip holder segments.

4. The welding fixture of claim 1 wherein said first and second electrical contact means each include a plurality of contact shoes, means by which said contact shoes are moved into electrical and mechanical engagement with the workpiece.

5. The welding fixture of claim 4 wherein said contact shoes include a plurality of contact materials to thereby provide an effective plurality of leading edge contacts between the workpiece and each contact shoe.

6. The welding fixture of claim 1 wherein said electrical contact means circumferentially extend about a common axial centerline and the contact means of one support means is arranged in opposition to the contact means of the other support means, each contact means has a plurality of electrical contact shoes, and each contact shoe having multiple contact material formed thereon for effecting a plurality of leading edge contacts between the surface of the workpiece and each of the electrical contact shoes.

7. The welding fixture of claim 1 wherein said slip segments circumferentially extend about a common axial centerline and the segments of one gripping member confronts the segments of the other gripping member;

said electrical contact means of each support member circumferentially extend about a common axial centerline and the contact means of one support member is arranged in opposition to the contact means of the other support member.

8. The welding fixture of claim 7 wherein said main frame is cylindrical, said contact means mounted on each support means are located inwardly of said gripping members.

9. The welding fixture of claim 1 wherein said first and second gripping members each include:

a working barrel supported in attached relationship to said main frame, an annular piston reciprocatingly received within said barrel, means for moving said annular piston axially respective to said barrel; said annular piston has an inside surface of conical configuration to provide a wedge-like inner surface, a plurality of segments made into an annular slip holder to provide an interior passageway which changes in cross-sectional area as the segments move radially towards and away from one another, the outside diameter of said annular slip holder is made complementary respective to the inside surface of said annular piston;

and slips for engaging a workpiece arranged on the inside surface of the slip holder;

means forming spaced variable chambers associated with said barrel and annular piston for moving the piston respective to the barrel as the chamber's volume is changed so that the annular piston extends and contacts the slip holder.

10. The welding fixture of claim 1 wherein means are provided by which said gripping members cause the first and second to come into abutting engagement with a relative small force to maximize the $I^2R$ heating and thereafter are moved towards one another with a relative large force to forge the workpieces together.

11. The welding fixture of claim 10 wherein said contact means are located inwardly of said gripping members;

said contact means include a plurality of contact materials to thereby provide an effective plurality of leading edge contact material between the workpiece and each contact shoe.

12. The welding fixture of claim 1 wherein said first and second gripping members each include:

a cylinder supported in attached relationship respective to said main frame, an annular piston reciprocatingly received within said cylinder, variable chamber means for moving said annular piston axially respective to said cylinder; said annular piston has an inside diameter of conical configuration to provide a wedge-like inner surface; a plurality of segments made into an annular slip holder to provide an interior passageway which changes in cross-sectional area as the segments move towards and away from one another, the outside diameter of said annular slip holder is made complementary respective to the inner surface of the annular piston;

and slips for engaging a workpiece arranged on the inside surface of the slip holder;

said electrical contact means include a plurality of contact shoes, each said contact shoe is moved radially into electrical and mechanical engagement with one of the workpieces; each contact shoe includes means forming a plurality of electrical contacts for engaging a workpiece in a manner to effect a plurality of leading edge contacts therebetween.

13. The welding fixture of claim 1 wherein the recited first and second workpiece is a first and second pipe, and said gripping member and said electrical contact means each circumferentially extend about a longitudinal axial centerline of the first and second pipes;

said main frame is a housing which is cylindrical in form.

14. The welding fixture of claim 1 wherein the first and second workpiece is a first and second rail, and said electrical contacts circumferentially extend about the longitudinal axis of the first and second rails;

said main frame is a housing which is cylindrical in form.

15. The welding fixture of claim 1 wherein said electrical contact means include a plurality of contact shoes, each of said contact shoes is moved radially and independently with respect to said slip segments into electrical and mechanical engagement with one of the workpieces;

said contact shoes each include a plurality of elements thereon to prevent edge burning.

16. A welding fixture for butt welding an elongated first and second workpiece together; comprising, in combination, a main frame; spaced axially aligned first and second cylinders supported by said main frame; first and second annular pistons, respectively, reciprocatingly received within said first and second cylinders, respectively; each said piston and cylinder include means forming a variable chamber therebetween whereby the pistons are moved towards and away from one another along a common axial centerline when the volume of the variable chamber is changed;

means for moving one of said cylinders toward and away from the other of said cylinders;

the inner surface of each annular piston is wedge-shaped, with the inside diameter of the pistons enlarging towards one another;

a plurality of slip segments received within each said piston, said slip segments of each piston form a slip assembly which is variable in diameter, the outside surface of the slip segments are made complementary respective to the inside surface of the annular piston;

slip means on the inside wall of each segment for engaging one of the workpieces; and, contact means mounted to move radially into electrical contact respective to one of the workpieces which may be held within the fixture; whereby each of the workpieces can be engaged by the slips and contact means, and the workpieces moved into abutting engagement with one another, so that the workpieces may be welded together.

17. The combination of claim 16 wherein one of said first and second cylinders is fixed respective to said frame;

said means for moving one said cylinder is a power fluid passageway means connected to move the other of said first and second cylinders so that the first and second workpieces are moved towards one another so that the first and second workpieces are moved towards one another with a small force and thereafter are further moved towards one another with a large force.

18. The combination of claim 17 wherein said electrical contact means include a plurality of contact shoes, means by which said contact shoes are moved concurrently with said slip segments into electrical and mechanical engagement with the workpieces.

19. The combination of claim 17 wherein said slip segments of each piston circumferentially extend about a common axial centerline and the slip segments of one piston are arranged in opposition respective to the slip segments of the other piston.

20. The combination of claim 17 wherein said electrical contact means circumferentially extend about a common axial centerline and the contact means by one set by slip segments are arranged in opposition respective to the contact means of the other slip segments.

21. The combination of claim 17 wherein said slip segments and said electrical contact means associated with each cylinder circumferentially extend about a common axial centerline and are placed in opposition respective to one another;

said electrical contact means associated with a cylinder are located adjacent to one another, said first and second cylinders are axially spaced from one another by said electrical contact means.

22. The welding fixture of claim 16 wherein said contact means include a plurality of contact shoes, means by which said contact shoe is moved radially into electrical and mechanical engagement with a workpiece;

each shoe having a plurality of electrical contact materials mounted thereon for concurrently engaging a workpiece.

23. The welding fixture of claim 16 wherein there is further included means forming spaced variable chambers associated with said first and second cylinders and annular pistons for moving the pistons respective to the cylinders so that the annular pistons extend and retract the slip segments;

said electrical contact means include a plurality of contact shoes, said contact shoe is moved radially into electrical and mechanical engagement with a workpiece that may be held by said slip segments.

24. The welding fixture of claim 16 wherein said slip segments are arranged about a common axial centerline;

said electrical contact means are arranged about a common axial centerline;

said means for moving one of said cylinders towards another of said cylinders includes means for moving one of said cylinders towards the other with a small force and thereafter with a large force so that the interface formed between first and second workpieces causes a large $I^2R$ drop to induce localized heating and then the workpieces are moved towards one another to cause one to be forged to the other.

25. The welding fixture of claim 24 wherein said contact means are located inwardly of said slip assembly and said main frame is of cylindrical configuration.

26. The welding fixture of claim 16 wherein said housing is cylindrical in form and the first and second workpieces are lengths of tubular members such as a pipe, said slip segments and electrical contacts circumferentially extend about the longitudinal axial centerline of said housing.

27. The welding fixture of claim 16 wherein said main frame is a housing which is cylindrical in form, the first and second workpieces are lengths of rail, said slip segments and electrical contacts circumferentially extend about the longitudinal axial centerline of said housing.

28. The welding fixture of claim 27 wherein said electrical contact means include a plurality of contact shoes, a hydraulically actuated cylinder attached to the first said cylinder by which said contact shoe is moved radially into electrical and mechanical engagement with a workpiece;

said contact shoes comprise a plurality of contact elements mounted thereon to prevent edge burning.

29. Apparatus for butt welding elongated workpieces, such as pipe and rail, comprising a main housing having a passageway formed therethrough which confronting workpieces can be abuttingly received;

confronting slip assemblies supported by said housing and within said passageway, means by which one slip assembly can be moved toward the other slip assembly, said slip assemblies have circumferentially spaced slip segments aligned about a common axis, means for moving said segments towards and away from one another;

electrical contact means supported for movement respective to said main housing; whereby, said slip segments and electrical contact means can be moved into engagement with a workpiece, and the workpieces moved into abutting relationship whereupon current flow through the electrical contact means and workpieces allows the workpieces to be welded together.

30. The apparatus of claim 29 wherein said electrical contact means include a plurality of contact shoes, said contact shoes are moved radially into electrical and mechanical engagement with respect to a workpiece.

31. The apparatus of claim 30 wherein said slip segments lie about a common axial centerline and the slip assemblies confront one another; means forming a piston and cylinder assembly to which each slip segment is connected for extending the contact shoe into engagement with a workpiece.

32. The apparatus of claim 29 wherein said housing is cylindrical in form and the workpiece is a rail; said slip segments and contact means circumferentially extend about a longitudinal axial centerline of the main housing.

33. The apparatus of claim 32 wherein said electrical contact means include a plurality of contact shoes, each of said contact shoes is moved radially into electrical and mechanical engagment with the workpiece;

each of said contact shoes comprises a contact surface having a plurality of contact elements thereon to prevent edge burning.

34. Method of butt welding workpieces together, comprising the steps of:
(1) arranging the workpieces in spaced, confronting relationship;
(2) engaging each workpiece with a slip means;
(3) engaging each workpiece with an electrical contact means;
(4) moving one of the slip means towards the other slip means to cause the confronting workpieces to abuttingly engage one another, supplying current through the contact means to allow the workpieces to become welded together;
(5) carrying out step (4) initially moving the slip means with a relatively small force to enable a large $I^2R$ drop to occur across the confronting faces of the workpieces, and thereafter, moving the slip means with a relatively large force to forge the heated workpieces together;
(6) discontinuing the current flow through the contact means, releasing the butt welded workpieces from the the contact means and the slip means, and removing the butt welded workpieces from the contact means and slip means.

35. The method of claim 34 and further including the step of:
(7) providing the electrical contacts with a plurality of individual contact areas to form an effective plurality of leading edge contacts respective to the workpiece.

36. Method of butt welding workpieces together, comprising the steps of:
(1) arranging the workpieces in spaced, confronting relationship;
(2) engaging each workpiece with a slip means;
(3) engaging each workpiece with an electrical contact means;
(4) providing the electrical contact means with a plurality of individual contact areas to form an effective plurality of leading edge contacts respective to the workpiece;
(5) moving one of the slip means towards the other slip means to cause the confronting workpieces to abuttingly engage one another, supplying current through the contact means to allow the workpieces to become welded together;
(6) carrying out step (5) by initially bringing the workpieces into abutting relationship with a relatively small force to enable a large $I^2R$ drop to occur across the confronting faces of the workpieces, and thereby heat the workpieces; and, thereafter, moving the slip means with a relatively large force to forge the heated workpieces together;
(7) discontinuing the current flow through the contact means, releasing the butt welded workpieces from the contact means and the slip means, and removing the butt welded workpieces from the contact means and slip means.

* * * * *

UNITED STATES PATENT AND TRADEMARK OFFICE
CERTIFICATE OF CORRECTION

PATENT NO. : 4,656,328

DATED : APRIL 7, 1987

INVENTOR(S) : JAMES M. WELDON; THEODORE A. AANSTOOS; RAYMOND C. ZOWARKA; WILLIAM F. WELDON.

It is certified that error appears in the above-identified patent and that said Letters Patent is hereby corrected as shown below:

Column 1, line 25, substitute --SCH-- for "SHC";
Column 5, line 37, substitute --was-- for "as";
Column 10, line 12, insert --is of-- before "annular";
Column 11, line 45, substitute --1²R-- for "12R".
Column 12, line 28, delete ";" after "15";
       Line 30, substitute --Parker-- for "parker".
Column 13, line 40, substitute --39'-- for "34".
Column 14, line 14, substitute --on-- for "o";
       Line 18, insert --hydraulic cylinders. These actuators are designed to operate at-- after "bore";
       Line 33, substitute --A-- for "R";
       Line 52, correct the spelling of "means".
Column 16, line 25, insert --workpieces-- after "second".
Column 17, lines 53 and 54, delete "so that the first and second workpieces are moved towards one another".
Column 18, line 1, substitute --of-- for "by";
       Line 2, substitute --of-- for "by".
Column 20, line 4, insert --by-- before "initially".

Signed and Sealed this

Twenty-second Day of September, 1987

Attest:

DONALD J. QUIGG

Attesting Officer    Commissioner of Patents and Trademarks